(12) United States Patent
Ben-Natan et al.

(10) Patent No.: US 8,898,796 B2
(45) Date of Patent: Nov. 25, 2014

(54) MANAGING NETWORK DATA

(75) Inventors: Ron Ben-Natan, Lexington, MA (US); Tamar Domany, Kiryat Tivon (IL); Ariel Farkash, Shimshit (IL); Igor Gokhman, Haifa (IL); Abigail Goldsteen, Haifa (IL); Yuval Hager, Slocan (CA); Ksenya Kveler, Yoqneam Illit (IL); Boris Rozenberg, Ramat Gan (IL); Ury Segal, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/396,271

(22) Filed: Feb. 14, 2012

(65) Prior Publication Data
US 2013/0212689 A1    Aug. 15, 2013

(51) Int. Cl.
G06F 21/00 (2013.01)
G06F 21/60 (2013.01)
G06F 17/27 (2006.01)
G06F 17/22 (2006.01)

(52) U.S. Cl.
CPC ........... *G06F 17/272* (2013.01); *H04L 2209/56* (2013.01); *G06F 21/606* (2013.01); *G06F 17/2247* (2013.01); *H04L 2463/102* (2013.01)
USPC ..................... 726/26; 726/1; 726/3

(58) Field of Classification Search
CPC . G06F 17/272; G06F 21/606; G06F 17/2247; H04L 2209/56; H04L 2463/102
USPC .................................. 726/1–25, 26
See application file for complete search history.

(56) References Cited

U.S. PATENT DOCUMENTS

| | | | |
|---|---|---|---|
| 6,289,334 B1 | 9/2001 | Reiner et al. | |
| 7,437,362 B1 | 10/2008 | Ben-Natan | |
| 7,496,575 B2 | 2/2009 | Buccella et al. | |
| 7,533,415 B2 * | 5/2009 | Chen et al. ...................... | 726/24 |
| 7,640,427 B2 | 12/2009 | Callas et al. | |
| 7,836,508 B2 | 11/2010 | Gumpel et al. | |
| 7,877,398 B2 | 1/2011 | Kroeschel et al. | |

(Continued)

FOREIGN PATENT DOCUMENTS

EP    1653710 A1    3/2006

OTHER PUBLICATIONS

Ong et al., "Privacy preserving database access through dynamic privacy filters with stable data randomization", pp. 1-6, 2007, University of Ottawa, Canada.

(Continued)

*Primary Examiner* — Chau Le
*Assistant Examiner* — Don Zhao
(74) *Attorney, Agent, or Firm* — Paul S. Drake

(57) ABSTRACT

A method, system or computer usable program product for masking communication data using context based rules including intercepting a communication between a server and a client by an intermediary, the communication having a recipient, parsing the communication by the intermediary to determine whether a context based alteration rule should be applied, responsive to an affirmative determination, applying the rule to the communication to produce an altered communication with altered data, and sending the altered communication to the recipient so that the altered data in the communication is utilized in a masked manner.

25 Claims, 10 Drawing Sheets

(56) References Cited

U.S. PATENT DOCUMENTS

| | | | |
|---|---|---|---|
| 7,917,770 | B2 | 3/2011 | Gopinath et al. |
| 2003/0131245 | A1 | 7/2003 | Linderman |
| 2004/0098609 | A1* | 5/2004 | Bracewell et al. ............ 713/200 |
| 2005/0238005 | A1* | 10/2005 | Chen et al. .................... 370/389 |
| 2006/0080352 | A1 | 4/2006 | Boubez et al. |
| 2006/0168255 | A1 | 7/2006 | Katz et al. |
| 2007/0064702 | A1 | 3/2007 | Bates et al. |
| 2007/0156793 | A1 | 7/2007 | D'Souza et al. |
| 2008/0256187 | A1* | 10/2008 | Kay ............................... 709/206 |
| 2008/0301803 | A1* | 12/2008 | Ontaneda et al. ............... 726/17 |
| 2009/0049512 | A1 | 2/2009 | Manickam et al. |
| 2009/0119768 | A1* | 5/2009 | Walters et al. .................. 726/12 |
| 2009/0132419 | A1 | 5/2009 | Grammer et al. |
| 2009/0249446 | A1* | 10/2009 | Jenkins et al. ..................... 726/3 |
| 2009/0271289 | A1* | 10/2009 | Klinger et al. .................. 705/26 |
| 2010/0081417 | A1* | 4/2010 | Hickie ......................... 455/414.1 |
| 2010/0241844 | A1* | 9/2010 | Hussain et al. ............... 713/150 |
| 2010/0313239 | A1 | 12/2010 | Chakra et al. |
| 2011/0161332 | A1 | 6/2011 | Milman et al. |
| 2011/0313981 | A1 | 12/2011 | Ben-Natan |

OTHER PUBLICATIONS

Compuware Corp., "Toolkit Provides Highly Productive Set of Data Utilities", published on the world wide web at http://www.compuware.com/mainframe-solutions/r/Fileaid_datasolutions.pdf.

Zeus Technology, "Traffic Manager", published on the world wide web at http://web.archive.org/web/20110603234245/http:/www.zeus.com/products/traffic-manager.

Riverbed Technology, "Stingray Traffic Manager", published on the world wide web at http://www.riverbed.com/us/products/stingray/stingray_tm.php.

Informatica Corporation, "Informatica PowerCenter Data Masking Option", published on the world wide web at http://www.informatica.com/INFA_Resources/ds_data_mask_6793.pdf.

Liver et al, "Privacy Application Infrastructure Confidential Data Masking", 2009 IEEE Conference on Commerce and Enterprise Computing, pp. 324-332.

Coplan, "Verdasys sets out to reshape DLP as enterprise information protection", The 451 Group, Aug. 17, 2009, published on the world wide web at: http://www.verdasys.com/images/uploads/451%20-Verdasys-%20IMPACT%20REPORT%20-%20%2017%20Aug%202009.pdf.

* cited by examiner

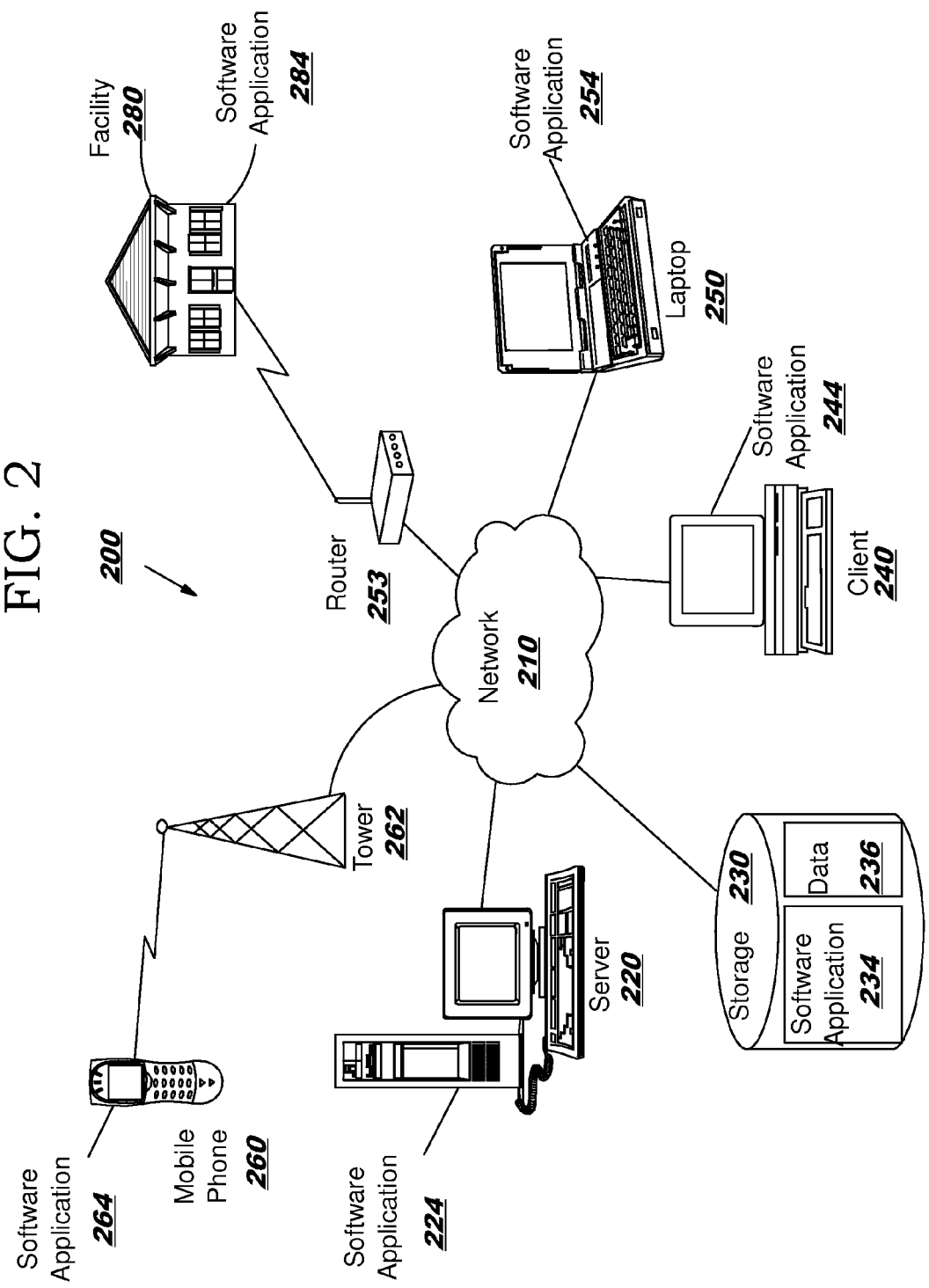

FIG. 6A

| 600 | |
|---|---|
| URL Prefix | 602 |
| Server IP Address | 604 |
| URL Suffix | 606 |
| Recipient Identifier(s) | 608 |
| Rule Script | 610 |

FIG. 6B

| 650 | |
|---|---|
| URL Prefix | 652 |
| Server IP Address | 654 |
| URL | 656 |
| Recipient Identifier(s) | 658 |
| Field Identifier(s) | 660 |
| Transformed data | 662 |
| Previous data | 664 |

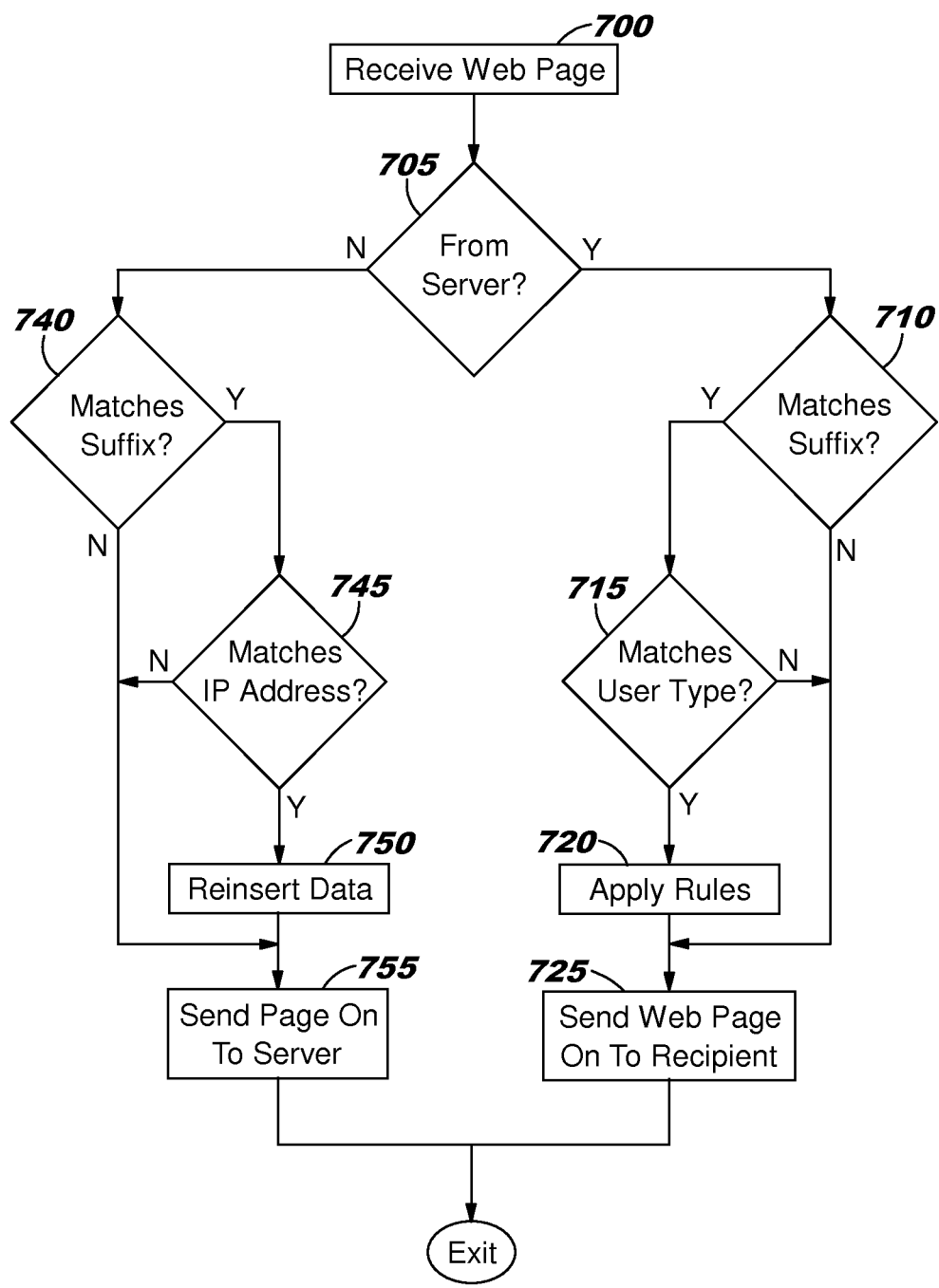

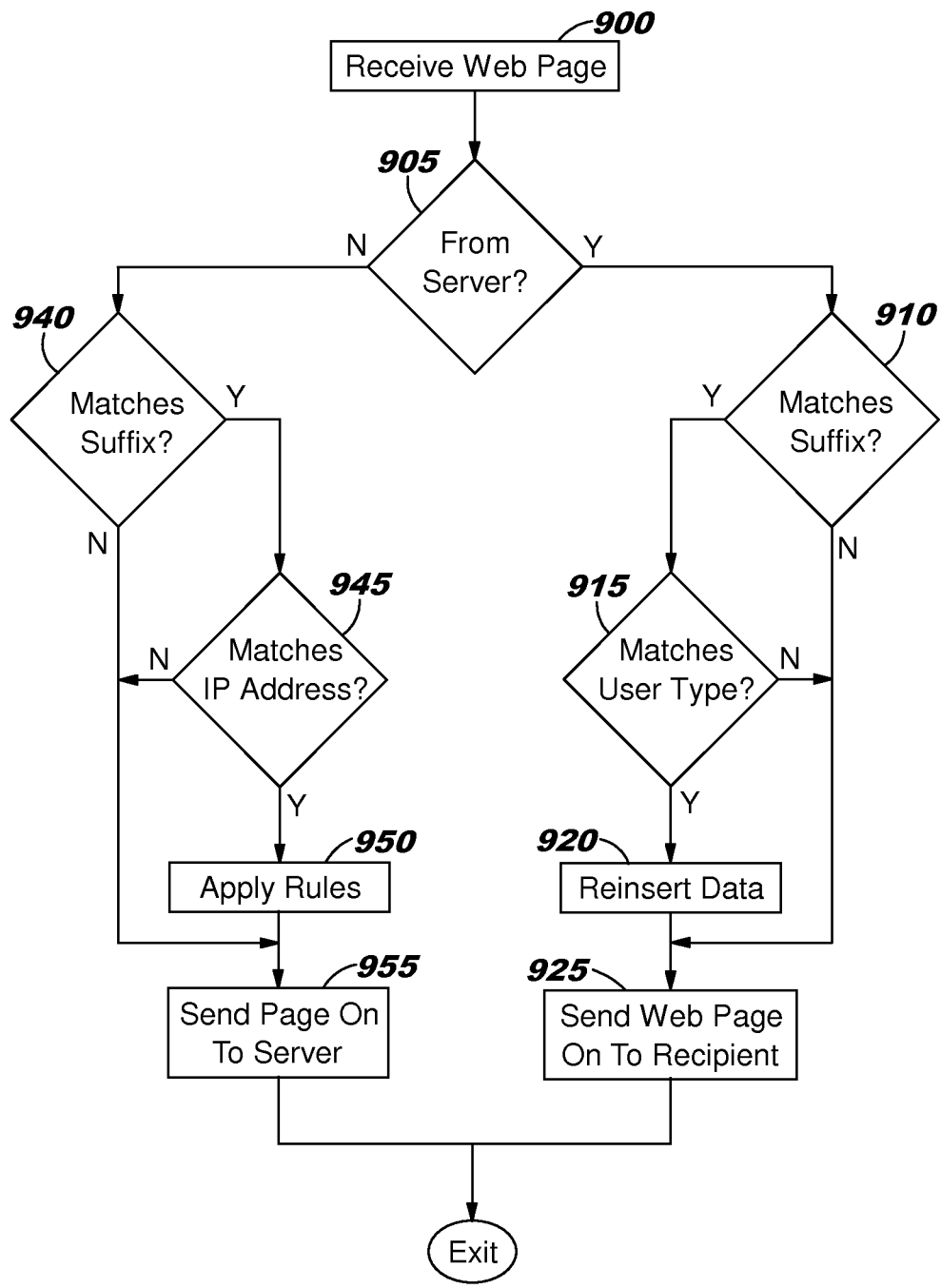

MANAGING NETWORK DATA

BACKGROUND

1. Technical Field

The present invention relates generally to managing network data, and in particular, to a computer implemented method for masking network data according to context based rules.

2. Description of Related Art

Enterprises attempt to strike a balance between protecting their sensitive data while needing to allow their personnel to utilize that sensitive data in the operations of the enterprise, both internally and externally. Such sensitive information is often shared through a variety of applications, including webpages which may be viewed internally and externally with proper authorization. Often enterprises rely on educating their employees to not release data where unauthorized personnel may receive that data. In addition, certain procedures may be implemented with an enterprise to further protect such sensitive information. Furthermore, some companies may utilize various types of snooping software to identify where certain information may have been improperly shared on-line such as by looking for certain codenames in email traffic.

Another problem enterprises face is that the definitions of who can or cannot see certain data may change over time. Changes in regulations and security/privacy can limit which employees have access to certain types of data such as personal identification information (PII) and protected health information (PHI). Also, if an enterprise decides to outsource operations there can be issues of data privacy and security. For example, a call enter application written 10 years ago where customer service agents were all internal employees may not be easily used when the customer service agents are outsourced to an external enterprise and even more so when these agents no longer work in the same country. In all these cases the enterprise may need to substantially modify or rewrite the application to comply with new privacy and security requirements. If the application is a legacy application written many years ago, such modifications may be time consuming and expensive.

SUMMARY

The illustrative embodiments provide a method, system, and computer usable program product for masking communication data using context based rules including intercepting a communication between a server and a client by an intermediary, the communication having a recipient, parsing the communication by the intermediary to determine whether a context based alteration rule should be applied, responsive to an affirmative determination, applying the rule to the communication to produce an altered communication with altered data, and sending the altered communication to the recipient so that the altered data in the communication is utilized in a masked manner.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 2 is a block diagram of a network of data processing systems in which various embodiments may be implemented;

FIGS. 6A and 6B are block diagrams of a rules database and a mapping table in which various embodiments may be implemented; and FIG. 7 is a flowchart of the masking and reinsertion of data in webpages in accordance with a first embodiment;

FIG. 9 is a flowchart of the masking and reinsertion of data in webpages in accordance with a second embodiment.

DETAILED DESCRIPTION

Steps may be taken to mask network data according to context based rules. These steps may be taken as will be explained with reference to the various embodiments below.

Figure 1:
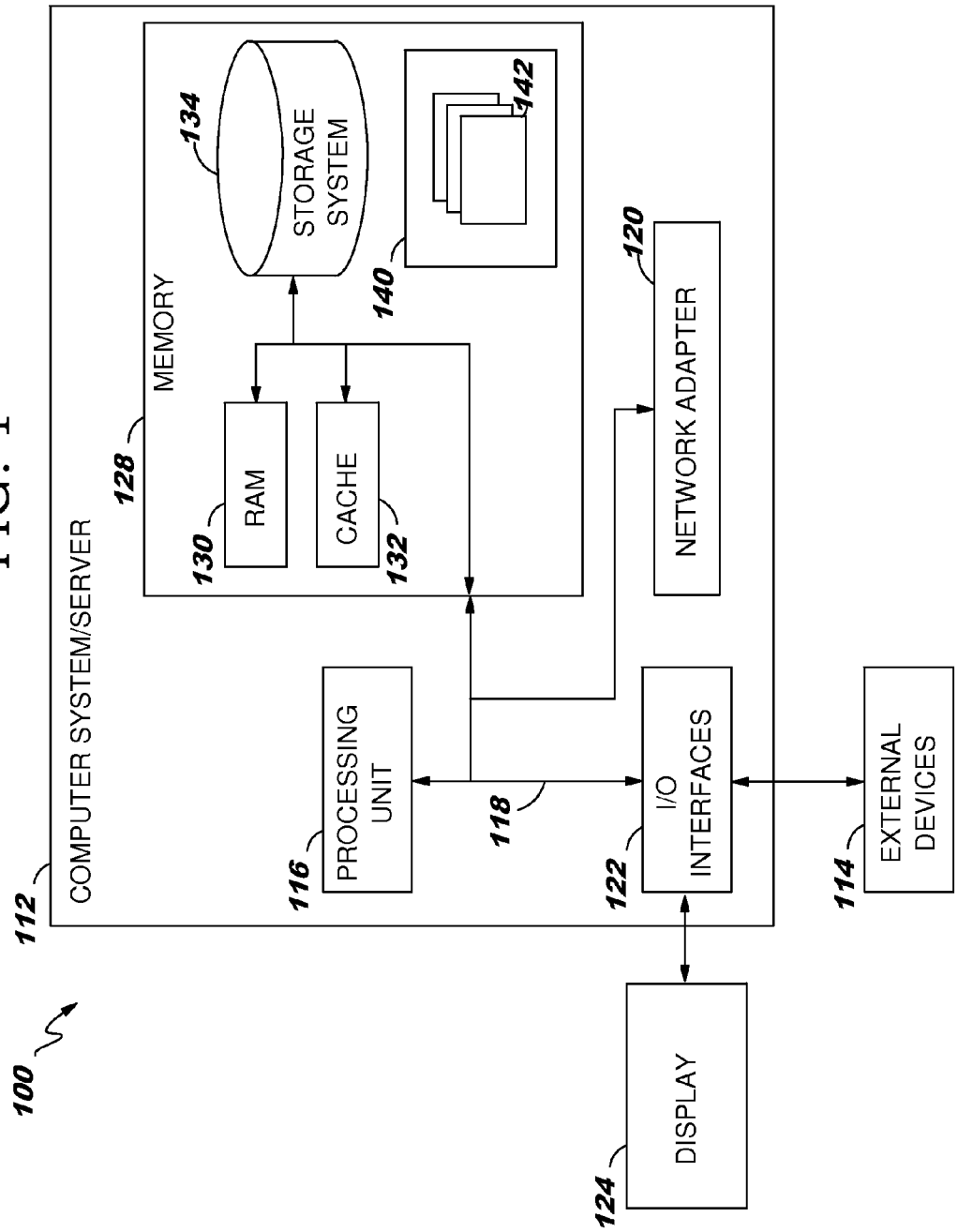
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for providing data to be shared across a network. For another example, a program module may be software for masking data being distributed across a network according to certain context based rules.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 such as a software application for providing data to be shared across a network, a software application for masking data being distributed across a network according to certain context based rules, a software application for allowing a user to define context based rules for masking data, or other software applications in accordance with embodiments described herein. Storage 230 may contain software application 234 and a content source such as data 236 for defining context based rules for masking data being shared across a network. Other software and content may be stored on storage 230 for sharing among various computer or other data processing devices. Client 240 may include software application 244. Laptop 250 and mobile phone 260 may also include software applications 254 and 264. Facility 280 may include software applications 284. Other types of data processing systems coupled to network 210 may also include software applications. Software applications could include a web browser, email, or other software application for masking data being distributed across a network according to certain context based rules.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages or other communications. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3A:
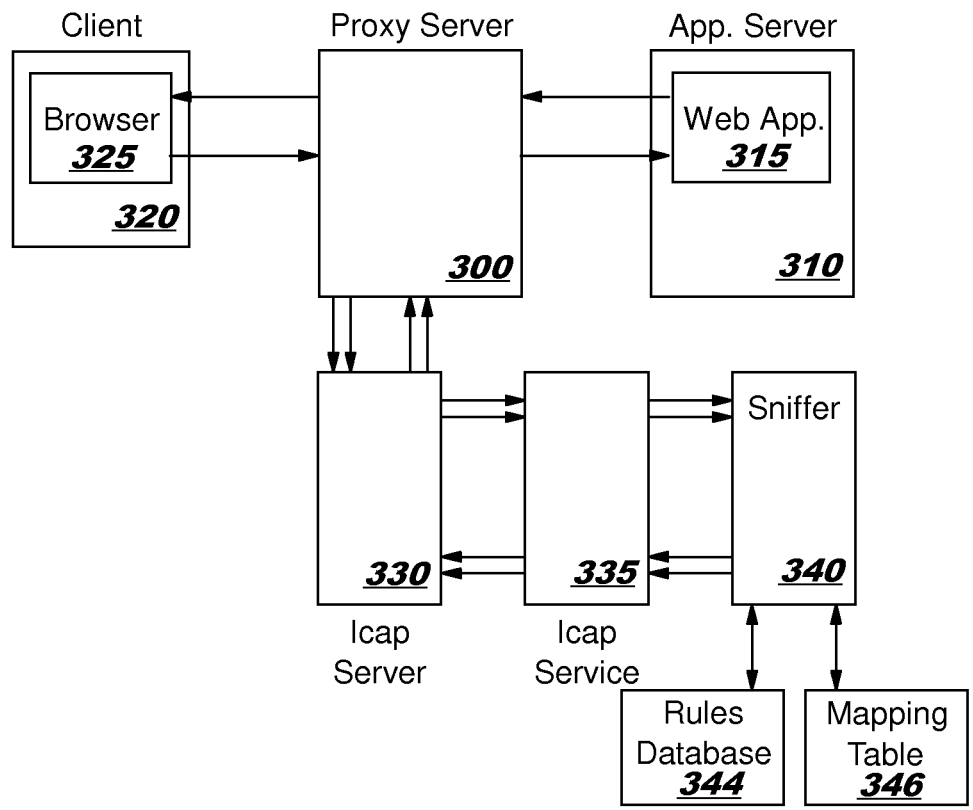
FIGS. 3A and 3B are block diagrams of example architectures in a client server environment in which various embodiments may be implemented.
Figure 3B:
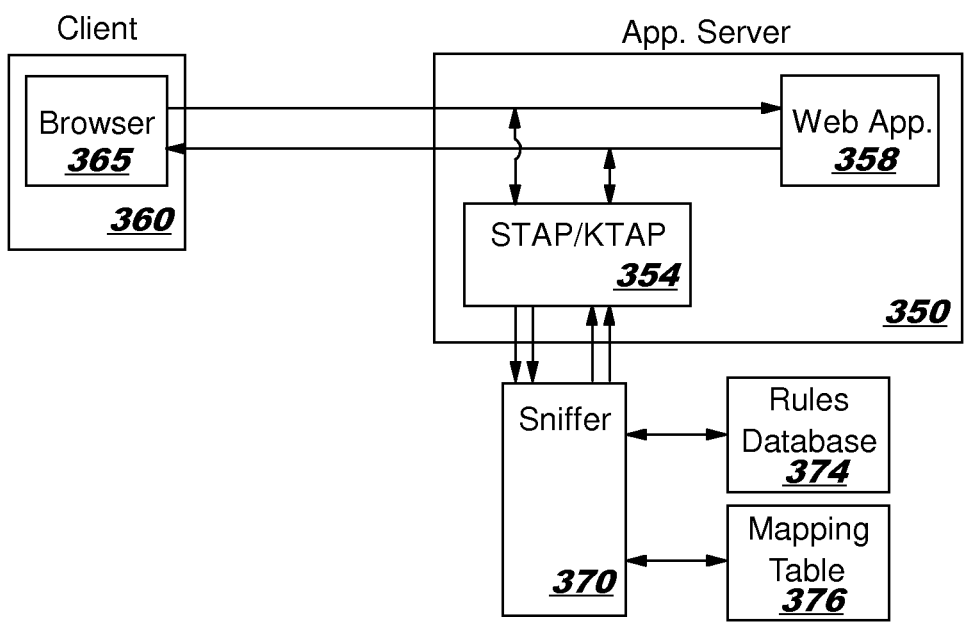

FIGS. 3A and 3B are block diagrams of example architectures in a client server environment in which various embodiments may be implemented. In these examples, communications including data in transit between an application server and a client browser are intercepted and modified to mask certain data contained within those communications in accordance with context based rules. In addition, that same data may be reinserted back into those communications from the client browser to the application server, the reinsertion of such data also referred to herein as masking.

FIG. 3A is a block diagram of a proxy server 300 intercepting communications between an application server 310 and a client 320. In this example, the communications are between a web application 315 on application server 310 and a browser 325 on client 320. These communications may be internal within an enterprise or with an external client such as through the firewall of an enterprise. Proxy server 300 examines ongoing communications to and from web application 315 to determine if those communications should be intercepted and possibly modified. For example, any HTTP (Hypertext Transfer Protocol) communications may be intercepted for possible modification. In another example, communications with certain application module(s) on an application server (e.g. an http server) may be intercepted for possible modification based on a URL (uniform resource locator) prefix of those communications. In alternative examples, other types of communications may be intercepted for possible modification between other types of applications such as 3270 applications in a mainframe environment and 5250 applications in a midrange server environment.

Once intercepted by proxy server 300, the communication is routed to an ICAP (Internet Content Adaption Protocol) server 330. An ICAP server is generally used to implement virus scanning and content filtering (e.g. identify and filter certain words or websites that may be inappropriate). The ICAP server then routes the communication through an ICAP service 335 to a sniffer 340, each of which may be running on the same server as the ICAP server or on another server. A sniffer is a type of packet analyzer/processor, also known as a network analyzer, for decoding and analyzing communication packets and for possibly making modifications to those communication packets. Sniffer 340 reviews the communications and applying rules stored on a rules database 344 against the communications as described below. Once the communication has been reviewed and possibly modified, it is then sent on to the intended recipient.

This review and modification of the communication may be two way. That is, content may be removed or transformed in a communication from web application 315 to browser 325 and then added back in a return communication from the browser to the web application. This allows the web application to process client responses without errors which may have been caused if such content was not added back in the return communication. The content removed or transformed may be stored in a mapping table 346 to be reintroduced to a return communication.

Communications include various attributes which may be used for intercepting the communications and for applying the rules for modifying those communications. Those attributes include the IP addresses of the server and the client, the user name of the client browser, the time of day, and various other attributes which may be used. Those attributes may be used to determine the rules that are applied to the communication. For example, users within an enterprise may be allowed to view more information that users external to the enterprise.

FIG. 3B is a block diagram of an intercepting agent 354 residing on an application server 350 intercepting communications between a web application 358 on the application server and a browser 365 residing on a client 360. These communications may be internal within an enterprise or with an external client such as through the firewall of an enterprise. Intercepting agent 354 examines ongoing communications to and from web application 358 to determine if those communications should be intercepted and possibly modified. For example, any HTTP (Hypertext Transfer Protocol) communications may be intercepted for possible modification. In another example, communications with certain application module(s) on an application server (e.g. an http server) may be intercepted for possible modification based on a URL prefix of those communications. In alternative examples, other types of communications may be intercepted between other types of applications such as proprietary SAP R/3 client/server communications.

The intercepting agent may be an STAP/KTAP (Software network tap/kernel network tap) which routes the intercepted communication to a sniffer 370. Sniffer 370 reviews the communications and applying rules stored on a rules database 374 against the communications as described below. Once the communication has been reviewed and possibly modified, it is then sent back to the intercepting agent 354 which then sends them on to the recipient.

This review and modification of the communication may be two way. That is, content may be removed or transformed in a communication from web application 358 to browser 365 and then added back in a return communication from the browser to the web application. This allows the web application to process client responses without errors which may have been caused if such content was not added back in the return communication. The content removed or transformed may be stored in a mapping table 376 to be reintroduced to a return communication.

Alternative examples may be utilized to intercept communications and modify those communications in accordance with certain rules. For example, a firewall server may be used to intercept communications with external clients. In addition, other types of communications such as screen based application protocols may be intercepted and modified according to certain rules.

Figure 4A:
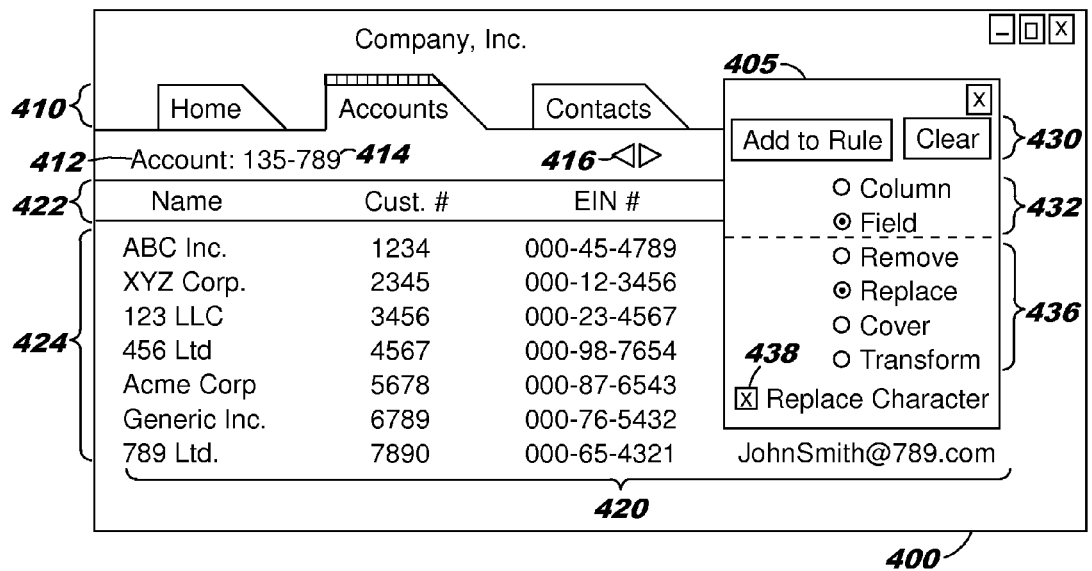
FIGS. 4A through 4C illustrate an example of a user interface for masking a web page in which various embodiments may be implemented.
Figure 4B:
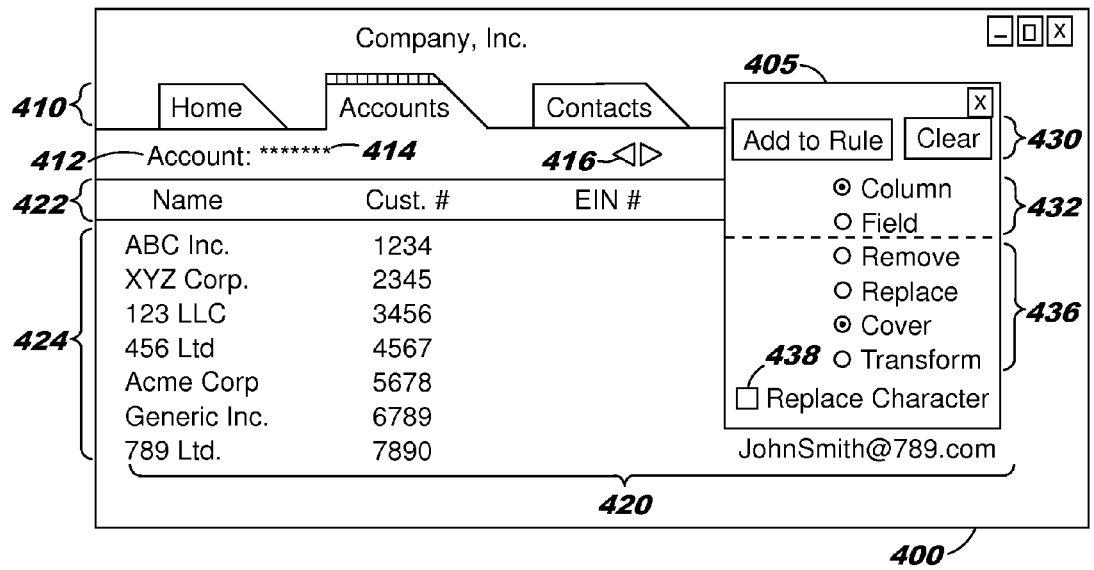
Figure 4C:
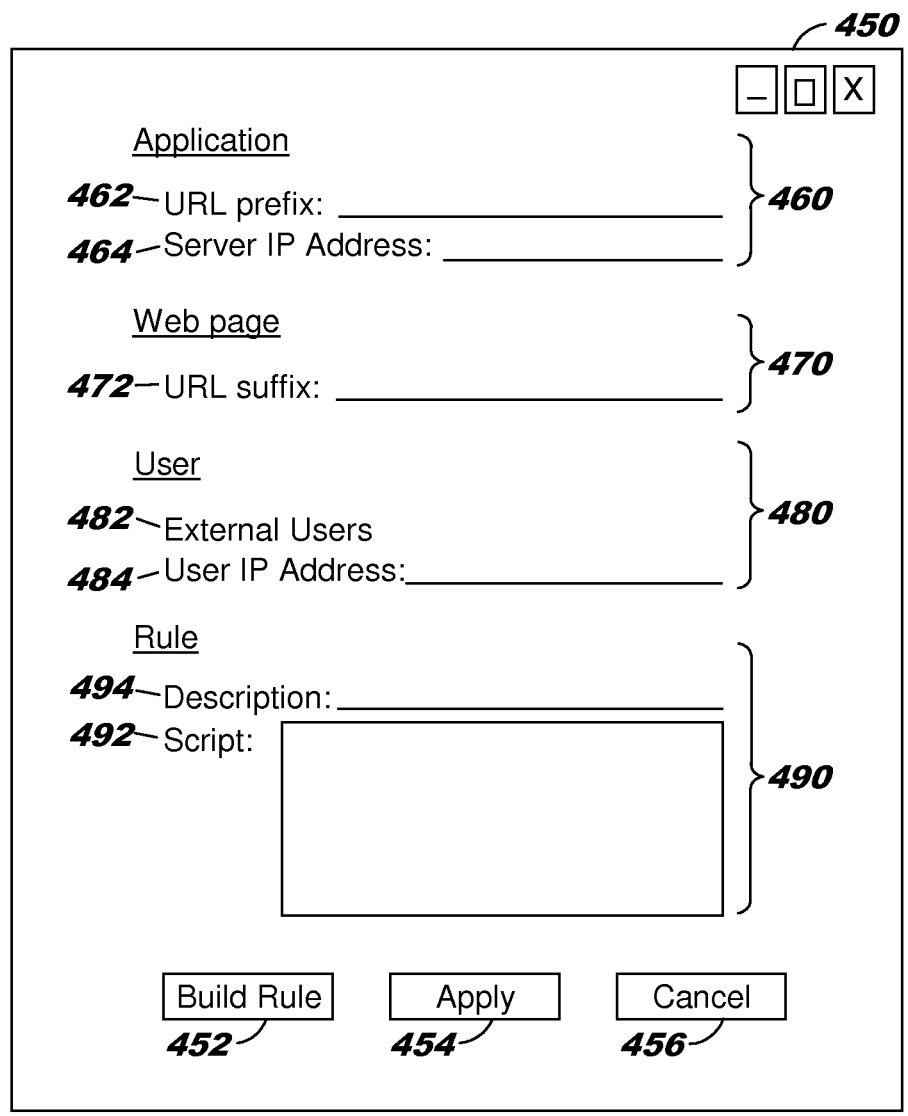

FIGS. 4A through 4C illustrate an example of a user interface for masking a web page in which various embodiments may be implemented. This may be performed by an information security administrator or other person knowledgeable about security issues and some knowledge of HTML objects, such as document object model (DOM) elements, or other protocols being utilized for distributing data. Such changes may be implemented across an enterprise with updates managed through a change management process. This process may be implemented based on the URL (universal resource locator) suffix of the webpage being intercepted and modified. For example, the same domain name may be used across an enterprise, but the suffix may sufficiently identify a particular web application within the domain. Since a web page and related objects may be constructed using browser resident code such as Javascript (e.g. Dojo or Ajax) and the page data may be communicated through data bearing protocols such as JSON, data masking may be done on such data as well as static HTML pages.

FIG. 4A is an illustration of a webpage 400 which may be intercepted and modified in which various embodiments may be implemented. This webpage example is shown without any masking or other modification of the page other than a pop-up window 405 which may be used by an administrator to create rules for such masking or modification. The pop-up window may be generated by an editor such as described with reference to FIG. 4C below. The webpage includes a set of tabs 410 of which the Account tab was selected. The selection of the accounts tab is further indicated by an account field label 412 which identifies the particular account number 414 being reviewed. A user may scroll through multiple accounts by clicking on the arrows 416. When another account is accessed by clicking on the arrows, account number 414 changes accordingly. Also shown are four columns of data 420 for this account. These columns include headers 422 and data 424.

Pop-up window 405 may be created by selecting a certain function button on a keyboard, right clicking a mouse to a desired menu selection, or other type of approach. Pop-up window includes buttons 430 for either adding a rule (including adding to an existing rule) or to clear the current addition to the rule to start over again. This allows the administrator to try different ways to mask the desired data. Other types of methods of user interfaces may be used in alternative embodiments for selecting data or for selecting how that data may be modified or otherwise masked.

Two context sensitive methods of selecting data for masking are shown as radio buttons 432. One radio button allows selecting a column of data to be masked. Another radio button allows selecting a field of data for masking. The type of masking used for hiding data may be selected from four radio buttons 436 as shown. A first Remove radio button may be selected for removing the selected data and not replacing it with anything else. A second Replace radio button may be selected for replacing selected data with a character entered into box 438. A third Cover radio button may be selected for covering selected data with a mask such as a color which could be identified in box 438. A fourth Transform radio button may be selected for transforming data to a value which can be uniquely represent the original value but which cannot be used to compute the original value based solely on the transformed value. However, the original value may be reconstructed by use of a unique value or by an algorithm not identified in the transformed data. This type of unique value is sometimes called a token or a key and an algorithm may be a one way hash function such as MD5 or SHA-1. If multiple hash functions are available, the user may select the desired function in box 438. Other types of methods for selecting data or how that data may be altered or otherwise masked may be used in alternative embodiments.

FIG. 4B is an illustration of webpage 400 with certain data masked in which various embodiments may be implemented. In this example, the account number is replaced with asterisks and the column of data under EIN # is covered so they are not visible. To replace the account number with asterisks or otherwise mask that data, the administrator may first select the Field radio button 432 and the Replace radio button 436 type an asterisk in field 438 as shown in FIG. 4A. The administrator may then select the account number 414 or the account field label 412 followed by clicking the Add to Rule button 430. The masking software will then replace or cover the account number with asterisks based on the location of the account number next to the account field label. This rule may be applied to other accounts if they utilize the same URL suffix as the current webpage. If not, other approaches may be implemented using the tool described with reference to FIG. 4C below.

The administrator may hide, cover or otherwise mask the EIN # by select the column radio button 432 and the cover radio button 436 as shown in FIG. 4B. The administrator may then select one of the EIN #s 420 or the EIN # column label 422 followed by clicking the Add to Rule button 430. The masking software will then cover the EIN #s with white fill based on the location of the EIN #s in the column of the EIN # column label. This rule may be applied to other accounts if they utilize the same URL suffix as the current webpage. If not, other approaches may be implemented using the tool described with reference to FIG. 4C below.

Once a rule or set of rules for a webpage are established, then the Administrator edits them using a rule and applies it or otherwise installs it using that rule.

FIG. 4C is an illustration of an editor used for managing the parameters of a rule established in FIGS. 4A and 4B above. Once a rule is established, the parameters of applying the rule may be set forth using this screen. A window 450 is shown with three buttons and four sections. A first button 452 labeled Build Rule is for invoking the pop-up window shown in FIGS. 4A and 4B above for setting up the rules for a given webpage. A second button 454 labeled Apply is for saving and applying a rule, typically after the four sections described below have been completed. The Apply button would save the rule in a rules database for application as set forth by the user. A third button 456 labeled Cancel is for canceling the recent actions of the editor since the last apply button was selected. This would cause any input in the four sections to be erased. The buttons may be pressed or otherwise selected by right clicking a mouse when the cursor is over the button.

The first section 460 is for identifying an application, the output of which may be modified according to various rules set forth as described below. This section may include the URL prefix 462 of the application and the IP address 464 of the server running the application. Alternative embodiments may use a variety of other ways to specify the application to which the rules may apply. This section may be completed before pressing the first button 452 labeled Build Rule. The first button may be disabled until this section is completed to require the user to complete this section first.

A second section 470 is for identifying the particular webpage(s) to which a rule may apply. This section includes a URL suffix 472. This suffix may include wild card characters to apply the rules to more than one webpage. Alternative embodiments may use other ways to specify the webpages or other outputs of the application which may be modified. Again, this section may be completed prior to pressing the first button 452 labeled Build Rule. However, if that button is pressed prior to completing this section and a webpage from the identified application is open in another window, the suffix from that application may be automatically entered into this section by the editor. Other information may be included in this section such as whether the webpage is HTML or JSON based.

A third section 480 specifies the user(s) which to which a given rule may apply. That is, the rule currently being generated by the user with the editor may be used for masking data sent to these users. For example, there may be some standard groupings which are set forth as radio buttons 482 such as users external to the enterprise or non-managers within the enterprise. In addition, specific users may be specified with their IP address 484. Alternative embodiments may use a variety to ways to specify these users. This section may be completed before or after generating a rule using the first button 452 labeled Build Rule.

A fourth section 490 specifies the rule being applied. It may be in the form of a script 492 which may be generated using the pop-up window in the application invoked by pressing the Build Rule button and as described above with reference to FIGS. 4A and 4B. The script for the rule may also be generated by either typing in the rule or copying and pasting a rule script from elsewhere. Also included is a description field 494 for identifying the rule. This description field may be useful for finding a particular rule to either modify that rule or to copy the script for that rule for use in another rule. Additional data may be included in this section such as the type of data being modified or otherwise masked is text or HTML based.

Figure 5:
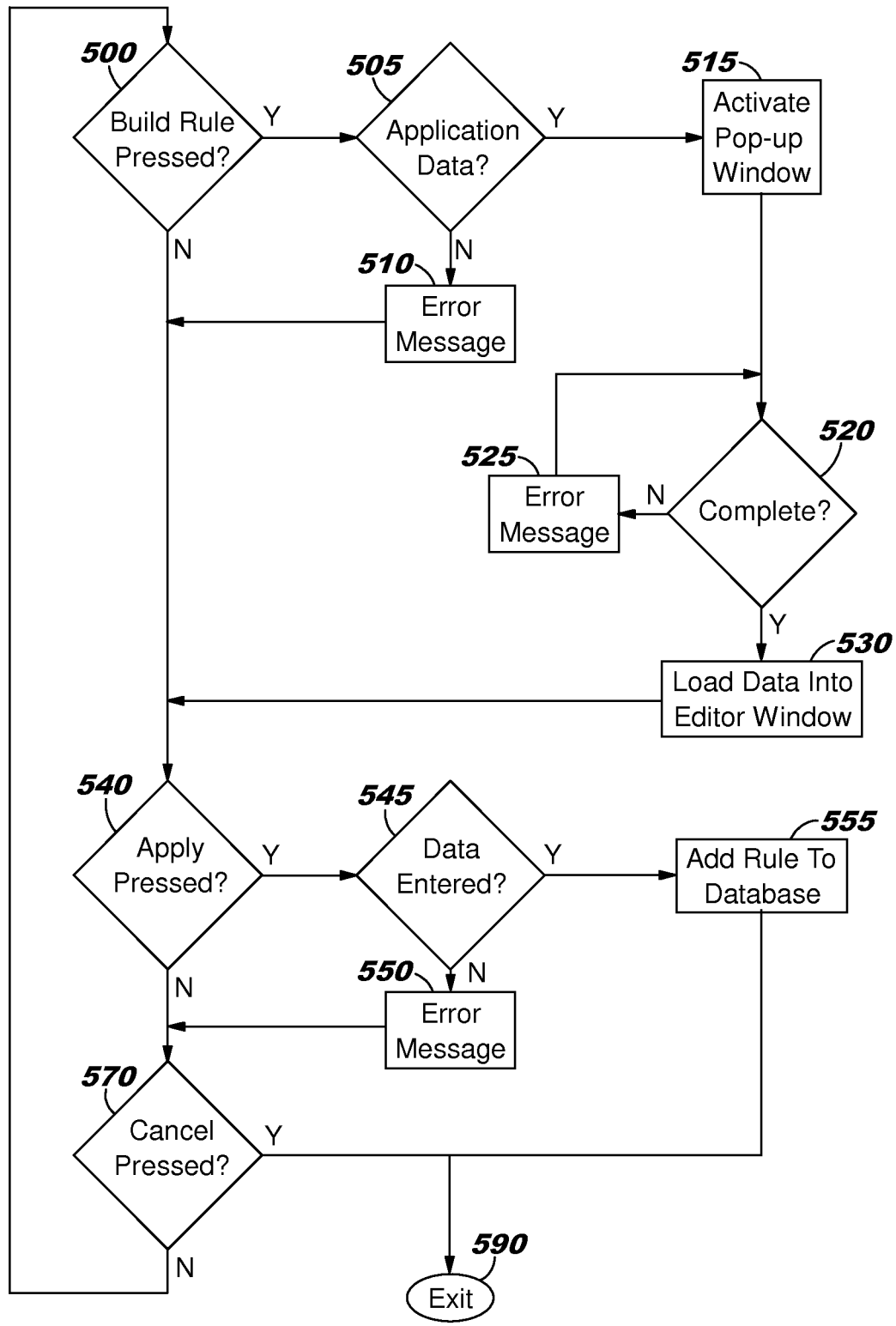
FIG. 5 is a flowchart of the process described above with reference to FIGS. 4A through 4C in which various embodiments may be implemented.

FIG. 5 is a flowchart of the process described above with reference to FIGS. 4A through 4C in which various embodiments may be implemented. This illustrates the operation of an editor for generating rules for applicability in masking webpages or other types of data. The editor may be initiated by a user through a variety of known processes such as clicking on an icon on the user's computer desktop. The user may then enter data on a window such as shown in FIG. 4C above. In this example, all three buttons of FIG. 4C are active when the editor is started.

In a first step 500, if the editor detects whether the Build Rule button has been pressed. This indicates that the user is asking for a pop-up box for building a rule on a webpage. If the Build Rule button has been pressed, then processing continues to step 505, otherwise processing continues to step 540. In step 505, the editor determines whether sufficient data has been entered to identify the application to which the rule may be applied. If not, then in step 510 an error message is generated and processing continues to step 540. If yes, then in step 515 the pop-up window is activated. Once the user has entered data in the pop-up window and the user indicates the rule generation process is complete (such as by pressing a control key), then in step 520 the editor determines whether enough information was generated in the pop-up window to continue processing. If not, then in step 525 an error message is generated and processing returns to awaiting the completion of the pop-up window. Otherwise, the data entered by the user through the pop-up window is loaded into the editor window in step 530. This data may include the webpage URL suffix, the rule script, etc. Processing may then proceed to step 540.

In step 540, it is determined whether the user has pressed the Apply button. If not, then processing continues to step 570. Otherwise, processing continues to step 545. In step 545, it is determined whether sufficient data was entered to create a valid rule in the rules database. This can include a URL suffix, identifiers of recipients for which the rule applies, field identifiers, the type of data to substitute in case of a replace, etc. If not, then an error message is generated in step 550 and processing continues to step 570. Otherwise, in step 555 the completed rule is loaded into the rules database and processing proceed to an exit in step 590.

In step 570, it is determined whether the user has pressed the Cancel button. If not, then processing returns to step 500. Otherwise, processing proceeds to an exit in step 590.

There are many alternatives that may be used to implement an editor to build rules for masking data. The above is an illustrative example of one such editor.

FIGS. 6A and 6B are block diagrams of a rules database and a mapping table in which various embodiments may be implemented. These are the data structures utilized to store the rules for masking data of intercepted webpages from the server to the client and for reinserting the data that was masked back to the webpage when that webpage is being sent back from the client to the server. These examples are based on the embodiments described above. Alternative embodiments may include many other data elements depending on the manner for which webpage applications, web pages, users and rules are identified and used.

FIG. 6A is a block diagram of an entry into rules database 600. There are five main data elements stored in this example. The first and second data elements are a URL prefix 602 of the application to which the rule applies and an IP address 604 of the server running this application. The third data element is a URL suffix 606 of the webpage to which the rule applies. This URL suffix may include wildcard characters to allow a rule to be applied to multiple webpages with URLs that have similar suffixes. The fourth data element is the user identification 608. That element is used to determine whether the rule applies to a given recipient of the webpage. This is compared to the data being passed with the webpage for that determination. This user identification may be an IP address of a specific user, any type of user grouping information which may be passed with the webpage across the network, or it may reference another database which groups users according to their IP addresses or other identifying attributes. The fifth data element is the actual rule script 610. This script is used to actually mask certain data in the webpage based on the context of that data within the webpage. In addition, some information may be masked based on content in addition to the context based rule.

FIG. 6B is a block diagram of an entry into mapping table 650. This table is used when data has been transformed for a recipient and the original data needs to be reinserted back into the webpage in a communication from the recipient back to the application (also referred to herein as masking). There are seven main data elements stored in this example. The first and second data elements are a URL prefix 652 of the application to which the rule applies and an IP address 654 of the server running this application. The third and fourth data elements are the URL 656 or other identifying information of the page which had data previously transformed and identifiers 658 of the recipient of the previously transformed webpage. This is used to determine whether there is an exact match of a previously transformed webpage. The fifth data element 660 is an identifier(s) of the data field(s) in the webpage which have been transformed. This allows the transformed information to the located within the webpage. The sixth and seventh data elements are the transformed data 662 and the previous data 664 which was included in the original webpage from the application. These data elements can then be used to reconstruct the webpage with the previously transformed data before sending that webpage onto the server.

FIG. 7 is a flowchart of the masking and reinsertion of data in webpages in accordance with a first embodiment. In a first step 700, a webpage is received which may have been intercepted by a proxy. Subsequently, in step 705, it is determined whether the webpage is being sent from a server to a client or from a client to a server. In this embodiment, if it is being sent from the server to a client, then it may need to be masked or if it is being sent from a client to a server, then data may need to be reinserted, the reinsertion of such data also referred to herein as masking.

If the webpage is from a server, then in step 710, it is determined whether the URL suffix of the webpage matches any URL suffix in the rules database. If not, then in step 725 the webpage is sent onto the recipient and processing ceases. Alternative embodiments may use a variety of other attributes to identify the webpage or other application output to which rules may be applied. If the URL suffix does match, then in step 715 it is determined whether the user type of the webpage matches the user type of the rule for that URL suffix. If not, then processing continues to step 725 where the webpage is sent onto the recipient. If there is a match in user type, then in step 720, the rule for that URL suffix and user type is applied and data is masked accordingly. Once completed, then in step 725, the masked webpage is sent onto the recipient.

If the webpage is from a client (not in step 705 above), then in step 740 it is determined whether the URL or other identifying information of the webpage matches any URL or other identifying information in the mapping table. If not, then in step 755 the webpage is sent onto the server and processing ceases. If the URL does match, then in step 745 it is determined whether the identifying information of the webpage sender matches the identifying information for a sender of that URL in the mapping table. If not, then processing continues to step 745 where the webpage is sent onto the server. If there is a match in sender identifying information, then in step 750 data previously removed from that webpage is reinserted into the webpage. Once completed, then in step 755, the reinserted webpage is sent onto the server.

Figure 8A:
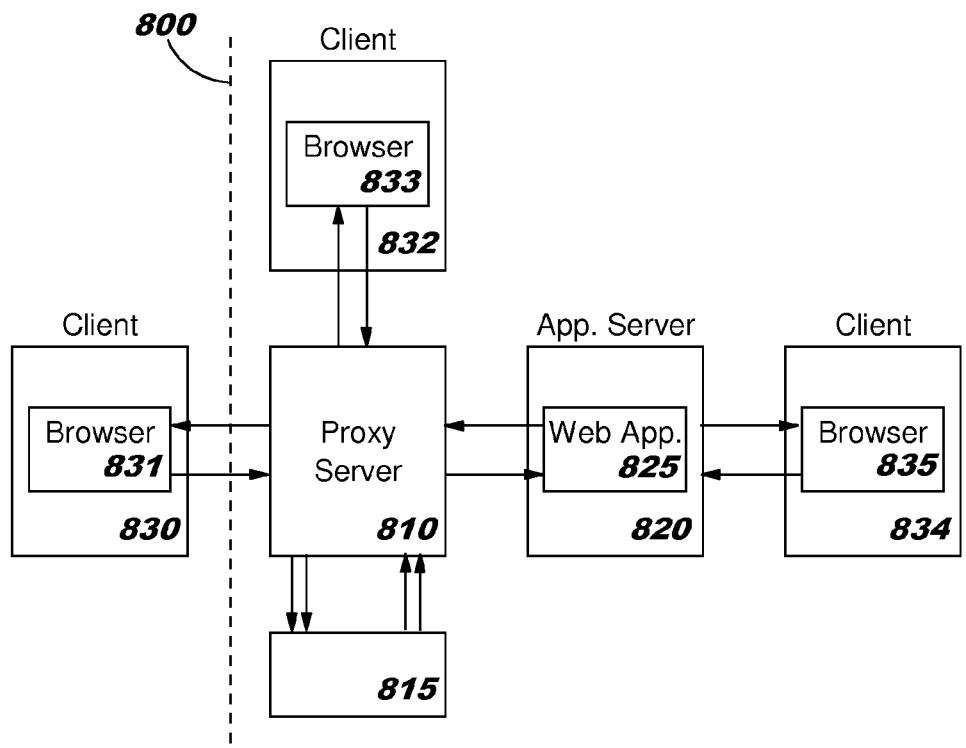
FIGS. 8A and 8B are block diagrams of example architectures in a bifurcated client server environment in which various embodiments may be implemented.
Figure 8B:
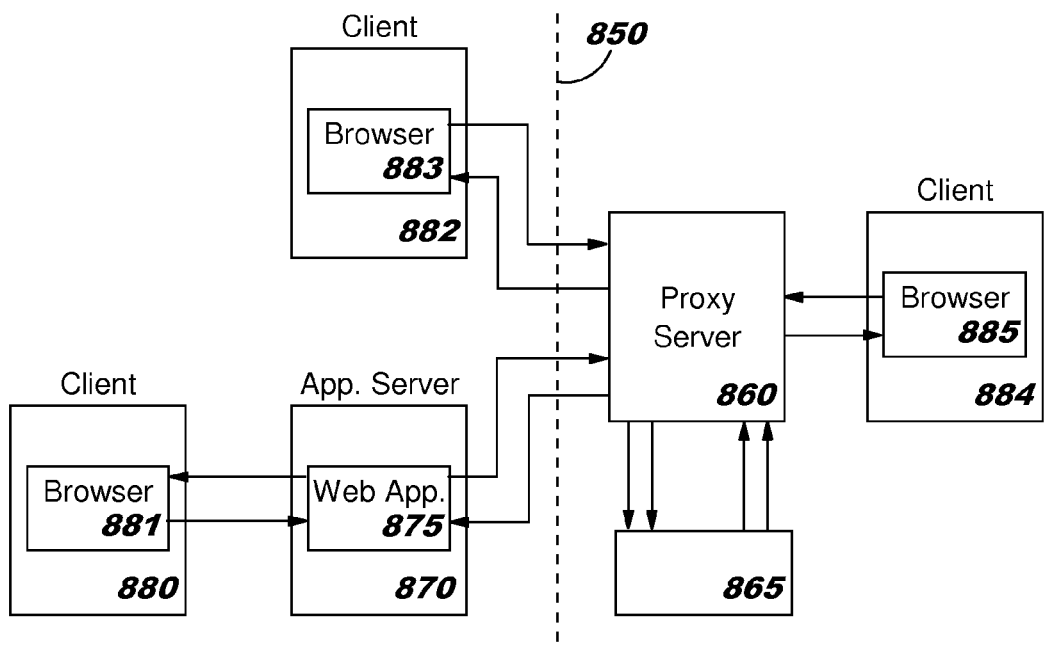

FIGS. 8A and 8B are block diagrams of example architectures in a bifurcated client server environment in which various embodiments may be implemented. These examples may be implemented where the client server environment may be bifurcated or otherwise segmented across one or more barriers. These barriers could include a firewall differentiating between internal and external clients or an international boundary where different laws apply on data privacy and security based on the location of a client. The barrier could also differentiate between data stored or applications running internally or externally in a cloud environment.

FIG. 8A is a block diagram of a proxy server 810 intercepting communications between an application server 820 and multiple clients 830 and 832. In this example application server 820, proxy server 810 and clients 832 and 834 are located behind a barrier 800 where the most sensitive or secure data may be stored. Another client 830 is located outside the barrier where sensitive data may not be shared. For example, barrier 800 may be a company firewall where internal clients may access sensitive data but external clients may not. For another example, barrier 800 may also be an international boundary where clients in one country (where the application server is located) may access sensitive data but clients in another country may not access that same data.

Application server 820 includes a web application 825 which accesses sensitive or secure data also stored behind barrier 800. Clients 830, 832 and 834 each include a web browser 831, 833 and 835 respectively for communicating with web application 825. Proxy server 810 intercepts and may modify communications between web application 825 and browsers 831 and 833. Proxy server 810 also communicates with support 815 which can include an Icap server, an Icap service, a sniffer, a rules database and a mapping table such as is shown in FIG. 3A above. In alternative embodiments, alternative support may be provided. Browser 835 also communicates directly with web application 825 without such communications being intercepted by proxy server 810.

In this example, the first embodiment, as described above with reference to FIG. 7, may be effective in preventing sensitive data from being shared with client 830 across barrier 800. That is, data which should not be shipped to clients outside the barrier may be intercepted and masked or otherwise modified by proxy 810. In addition, additional clients such as client 832 may have certain sensitive data masked from communications from application server 820 based on other criteria. Finally, some clients behind barrier 800 such as client 834 may be given unfettered access to communications with application server 820 as both are behind barrier 800.

FIG. 8B is a block diagram of a proxy server 860 intercepting communications between an application server 870 and multiple clients 882 and 884. In this example proxy server 860 and client 834 are located behind a barrier 850 where the most sensitive or secure data may be stored. Application server 870 and clients 830 and 832 are located outside the barrier where sensitive data may not be shared. For example, barrier 850 may be a company firewall where internal clients may access sensitive data but certain external clients may not. As an extension of this example, application server 870 and any data it may access may be located on the cloud where an enterprise may not wish to store certain sensitive data. As another example, barrier 850 may also be an international boundary where clients in one country (where the application server is located) may access sensitive data but clients in another country may not access that same data.

Application server 870 includes a web application 875 which may not access certain sensitive or secure data stored behind barrier 850. Clients 880, 882 and 884 each include a web browser 881, 883 and 885 respectively for communicating with web application 875. Proxy server 860 intercepts and may modify communications between web application 875 and browsers 883 and 885. Proxy server 860 also communicates with support 865 which can include an Icap server, an Icap service, a sniffer, a rules database and a mapping table such as is shown in FIG. 3A above. In alternative embodiments, alternative support may be provided. Browser 881 also communicates directly with web application 875 without such communications being intercepted by proxy server 860.

In this example, a second embodiment as described above and with reference to FIG. 9 below, may be effective in preventing sensitive data from being provided to application server 870 or being shared with client 880 and possibly client 882 across barrier 850 while allowing client 884 and possibly client 882 access to that sensitive data. That is, data which should not be stored or shared with clients or the web application outside the barrier may be intercepted and masked or otherwise modified by proxy 810. However, such sensitive information may be stored in a mapping table for sharing with clients that should have access to that information. That is, the proxy server can remove certain sensitive information based on context based rules in communications from clients to an application server, then reinsert that information in communications from the application server to certain clients.

In the example of the barrier being an international barrier where the application server is located in a country that should not receive certain sensitive information, both clients 880 and 882 should not have access to the sensitive information stored in a mapping table whereas client 884 may be allowed access to that information. However, in the case where the barrier is a cloud where the application server is also located in the cloud where certain information should not be stored, client 880 should not have access to the sensitive information stored in the mapping table whereas clients 882 and 884 may be allowed access to that information. In these cases, the proxy server can make these determinations and modify communications between the application server and the clients appropriately.

FIG. 9 is a flowchart of the masking and reinsertion of data in webpages in accordance with a second embodiment. In this embodiment, certain sensitive information may not be accessible by an application server or a web application outside a barrier, but yet needs to be accessible by certain clients with browsers communicating with that web application. This can be accomplished by using a proxy server with a mapping table for storing that sensitive information behind the barrier and then reinserting that information in communications with certain clients and their browsers, which is also referred to herein as masking.

In a first step 900, a webpage is received which may have been intercepted by a proxy. Subsequently, in step 905, it is determined whether the webpage is being sent from a server outside a barrier to a client or from a client to a server outside the barrier. If it is being sent from the client to a server, then it may need to be masked. For example, a data entry user may have entered some sensitive data into a field that is used for sensitive data. If it is being sent from a server to a client, then data may need to be reinserted (another form of masking).

If the webpage is from a server, then in step 910, it is determined whether the URL suffix of the webpage matches any URL suffix in the rules database which may indicate it is located outside a barrier. If not, then in step 925 the webpage is sent onto the recipient and processing ceases. Alternative embodiments may use a variety of other attributes to identify the webpage or other application output to which rules may be applied. If the URL suffix does match, then in step 915 it is determined whether the user type of the webpage matches the user type of the rule for that URL suffix. If not, then processing continues to step 925 where the webpage is sent onto the recipient. If there is a match in user type, then in step 920, data previously removed from that webpage is reinserted into the webpage. This may be accomplished by using a transformation of the previously masked data into the reinserted data using a token stored in the mapping table or by entering data stored for that field from the mapping table. Once completed, then in step 925, the reinserted webpage is sent onto the recipient.

If the webpage is from a client (not in step 905 above), then in step 940 it is determined whether the URL or other identifying information of the webpage matches any URL or other identifying information in the mapping table. If not, then in step 955 the webpage is sent onto the server and processing ceases. If the URL does match, then in step 945 it is determined whether the identifying information of the webpage sender matches the identifying information for that URL in the mapping table. If not, then processing continues to step 945 where the webpage is sent onto the server. If there is a match in recipient identifying information, then in step 950 the rule for that URL suffix and user type is applied and data is masked accordingly before being sent to the web application. This masking may be a transformation such as using a token or by storing the masked data in the mapping table for future reinsertion followed by masking the data contained in the webpage. Once completed, then in step 955, the masked webpage is sent onto the server.

When building or moving a web application and the underlying data outside a barrier, certain data utilized by the web application may be masked and a mapping table built with rules for reinserting that data under appropriate conditions such as when a client located behind the barrier is accessing that data. That mapping table and the rules for reinsertion would then be created behind the barrier for protection. This would allow certain clients to access that sensitive data even though the web application and most of its underlying data is outside the barrier.

The first and second embodiments may be used in combination. That is, the application server may be located on the cloud without direct access to certain information and some clients may be located internally to an enterprise yet across international borders where again that information may not be permitted. In such cases, a proxy may be implemented to retain that information in a mapping table with context rules for masking or reinserting and allowing that information to be provided or not to certain clients based on their location or other parameters. As a result, a communication from a server to a client may mask some data and reinsert other data and a communication from a client to a server may reinsert some data and use other forms of masking for other data.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as may be used for masking and reinserting data in transit. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of masking communication data using context based rules comprising:
    intercepting a communication between a server and a client by a computing system based intermediary, the communication including data to be displayed on a screen to a recipient;
    examining attributes, including a user type of the recipient, to determine whether the communication should be parsed prior to the client receiving the communication to determine whether a context based alteration rule should be applied;
    responsive to an affirmative determination that the communication should be parsed based on the attributes, utilizing a processor to parse the intercepted communication to determine whether a context based alteration rule should be applied;
    responsive to an affirmative determination that the context based alteration rule should be applied, applying the context based alteration rule to preselected data fields within the intercepted communication based on the attributes and on a location of the data fields that are associated with data to be altered within the communication to produce an altered communication with the altered data; and
    sending the altered communication to the client so that the altered data in the communication is displayed in a masked manner on the screen to the recipient;
    wherein the context based alteration rule includes contextual information on how the data fields to be altered would appear on the screen to the recipient prior to the data fields being altered.

2. The method of claim 1 wherein the recipient is the client and the communication is utilized by the client displaying the altered communication.

3. The method of claim 2 wherein the user type is selected from a group consisting of an internal client, an external client, or a country location of a client.

4. The method of claim 1 wherein the location of the data fields is based on how the-data fields would appear on the screen.

5. The method of claim 1 wherein the recipient is the server and the communication is utilized by the server storing altered data of the altered communication in memory.

6. The method of claim 1 wherein the intercepted communication is altered by masking data fields within the communication in accordance with the context based alteration rule.

7. The method of claim 6 wherein the communication is altered by reinserting previously masked data within the intercepted communication based on the contextual information on how the displayed data field would appear on the screen to the recipient prior to the data field being altered.

8. The method of claim 1 wherein the intermediary is a proxy server.

9. The method of claim 1 wherein the communication is a first web based message describing a first part of a user interface element and the method comprises:
   examining attributes, including the user of the recipient, of a second communication between the server and the client by the computing system based intermediary to determine whether the second communication should be intercepted prior to the client receiving the second communication, the second communication including data to be displayed on the screen to the recipient, wherein the second communication is a second web based message describing a second part of the user interface element;
   responsive to an affirmative determination that the second communication should be intercepted based on the attributes of the second communication, intercepting the second communication by the intermediary prior to the client receiving the second communication;
   utilizing the processor to parse the intercepted second communication to determine whether a second context based alteration rule should be applied;
   responsive to an affirmative determination that the second context based alteration rule should be applied, applying the second rule to preselected data fields within the intercepted second communication to produce an altered second communication; and
   sending the altered second communication to the recipient so that the user interface element is displayed in a masked manner when the altered communication is displayed to the recipient.

10. The method of claim 1 further comprising:
    utilizing the processor to parse the communication to determine whether a content based rule should be applied; and
    responsive to an affirmative determination of a content based rule, applying the content based rule to produce an altered communication.

11. A method of masking communications data using context based rules comprising:
    intercepting a first communication from a server to a client by an intermediary, the communication including data to be displayed on a screen to a recipient;
    examining attributes, including a user type of the recipient, to determine whether the first communication should be parsed prior to the client receiving the first communication to determine whether a context based rule should be applied;
    responsive to an affirmative determination that the first communication should be parsed based on the attributes, parsing the intercepted first communication to determine whether a context based alteration rule should be applied;
    responsive to an affirmative determination that the context based alteration rule should be applied, applying the context based alteration rule to preselected data fields within the intercepted first communication based on the attributes and on a location of the data fields that are associated with first data to be altered within the first communication to produce an altered first communication with the altered first data;
    sending the altered first communication to the client so that the altered first data in the altered first communication is displayed in a masked manner on the screen to the recipient;
    intercepting a second communication from a client to a server by the intermediary;
    examining attributes, including a user type of the recipient, to determine whether the second communication should be parsed prior to the client receiving the second communication to determine whether a context based rule should be applied;
    responsive to an affirmative determination that the second communication should be parsed based on the attributes, parsing the intercepted second communication to determine whether a second context based alteration rule should be applied;
    responsive to an affirmative determination that the second context based alteration rule should be applied, applying the second context based alteration rule to preselected data fields within the intercepted second communication based on the attributes and on a location of the data fields that are associated with second data to be altered within the communication to produce an altered second communication with the altered second data; and
    sending the altered second communication to the server so that the altered second data in the altered second communication is stored in memory;
    wherein the first context based alteration rule includes contextual information on how the first data would appear on the screen to the recipient prior to the data fields being altered.

12. A computer usable program product comprising a non-transitory computer usable storage medium including computer usable code for use in masking communication data using context based rules, the computer usable program product comprising code for performing steps of:
    intercepting a communication between a server and a client by an intermediary, the communication including information to be displayed on a screen to a recipient;
    examining attributes, including a user type of the recipient, to determine whether the communication should be parsed prior to the client receiving the communication to determine whether a context based rule should be applied;
    responsive to an affirmative determination that the communication should be parsed based on the attributes, parsing the intercepted communication to determine whether a context based alteration rule should be applied;
    responsive to an affirmative determination that the context based alteration rule should be applied, applying the context based alteration rule to preselected data fields within the intercepted communication based on the attributes and on a location of the data fields that are associated with data to be altered within the communication to produce an altered communication with the altered data; and
    sending the altered communication to the client so that the altered data in the communication is displayed in a masked manner on the screen to the recipient;

wherein the first context based alteration rule includes contextual information on how the data fields to be altered would appear on the screen to the recipient prior to the data fields being altered.

13. The computer usable program product of claim 12 wherein the recipient is the client and the communication is utilized by the client displaying the altered communication.

14. The computer usable program product of claim 13 wherein the user type is selected from a group consisting of an internal client, an external client, or a country location of a client.

15. The computer usable program product of claim 13 wherein information on how the data is to be displayed on the screen is selected from a group of a named column, a named row or a named field.

16. The computer usable program product of claim 12 wherein the recipient is the server and the communication is utilized by the server storing altered data of the altered communication in memory.

17. The computer usable program product of claim 12 wherein the intercepted communication is altered by masking data fields within the communication in accordance with the context based alteration rule.

18. The computer usable program product of claim 17 wherein the intercepted communication is altered by reinserting previously masked data fields within the intercepted communication based on the contextual information on how the displayed data fields would appear on the screen to the recipient prior to the data fields being altered.

19. A data processing system for masking communication data using context based rules, the data processing system comprising:
a processor; and
a memory storing program instructions which when executed by the processor execute steps of:
intercepting a communication between a server and a client by an intermediary, the communication including data to be displayed on a screen to a recipient;
examining attributes, including a user type of the recipient, to determine whether the communication should be parsed prior to the client receiving the communication to determine whether a context based rule should be applied;
responsive to an affirmative determination that the communication should be parsed based on the attributes, parsing the intercepted communication to determine whether a context based alteration rule should be applied;
responsive to an affirmative determination that the context based alteration rule should be applied, applying the context based alteration rule to preselected data fields within the intercepted communication based on the attributes and on a location of the data fields that are associated with data to be altered within the communication to produce an altered communication with the altered data; and
sending the altered communication to the client so that the altered data in the communication is displayed in a masked manner on the screen to the recipient;
wherein the context based alteration rule includes contextual information on how the data fields would appear on the screen to the recipient prior to the data fields being altered.

20. The data processing system of claim 19 wherein the recipient is the client and the communication is utilized by the client displaying the altered communication.

21. The data processing system of claim 20 wherein the user type is selected from a group consisting of an internal client, an external client, or a country location of a client.

22. The data processing system of claim 20 wherein information on how the data is to be displayed on the screen is selected from a group of a named column, a named row or a named field.

23. The data processing system of claim 19 wherein the recipient is the server and the communication is utilized by the server storing altered data of the altered communication in memory.

24. The data processing system of claim 19 wherein the intercepted communication is altered by masking data fields within the communication in accordance with the context based alteration rule.

25. The data processing system of claim 24 wherein the intercepted communication is altered by reinserting previously masked data fields within the intercepted communication based on the contextual information on how the displayed data fields would appear on the screen to the recipient prior to the data fields being altered.

* * * * *